(12) United States Patent
Kullström et al.

(10) Patent No.: US 6,201,860 B1
(45) Date of Patent: *Mar. 13, 2001

(54) INTERACTION HANDLER FOR TELEPHONE SUBSCRIBER SERVICES

(75) Inventors: Tomas Kullström, Vallentuna; Friedrich Elteser, Stockholm; Tore Gunnarsson, Bromma, all of (SE)

(73) Assignee: Telefonaktiebolaget L M Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,212

(22) Filed: Feb. 18, 1998

(51) Int. Cl.$^7$ ....................................... H04M 3/42

(52) U.S. Cl. ........................................... 379/201; 379/207

(58) Field of Search .................... 379/201, 207, 379/211, 259

(56) References Cited

U.S. PATENT DOCUMENTS 5,657,451 * 8/1997 Khello .................................. 379/201
5,991,620 * 11/1999 Kingdon et al. ..................... 455/430

FOREIGN PATENT DOCUMENTS

| 0 576 864 A2 | 1/1994 | (EP) . |
| 0 725 525 A2 | 8/1996 | (EP) . |
| 0 763 951 A2 | 3/1997 | (EP) . |
| 0 825 787 A1 | 2/1998 | (EP) . |
| WO 95/18503 | 7/1995 | (WO) . |

OTHER PUBLICATIONS

L. Schessel; *Administrable Feature Interaction Concept*; International Switching Symposium (ISS '92), Oct. 25–30, 1992, vol. 2; pp. 122–126.

Kristofer Kimbler, Eric Kuisch and Jacques Muller; *Feature Interactions Among Pan–European Services*; Second International Workshop on Feature Interactions in Telecommunications Systems in Amsterdam; May 8–10, 1994; pp. 73–85.

Dave Marples, Simon Tsang, Evan H. Magill and Geoffrey Smith; *A Platform for Modelling Feature Interaction Detection and Resolution Techniques*; Third International Workshop on Feature Interactions in Telecommunications Systems in Kyoto; Oct. 11–13, 1995; pp. 185–199.

PCT International Search Report dated May 6, 199.

* cited by examiner

Primary Examiner—Creighton Smith
(74) Attorney, Agent, or Firm—Jenkens & Gilchrist, P.C.

(57) ABSTRACT

A centralized service interaction handler unit is provided in a communications network. This interaction handler includes a database with a plurality of matrices, with one matrix for each type of interaction (e.g., activation of a service, deactivation of a service, roaming between countries, etc.). The interaction handler accesses a pertinent matrix each time such an activation, deactivation, roaming, etc. operation is executed. The accessed matrix is used to determine the action to be taken when a service that interacts with the requested service is encountered.

12 Claims, 2 Drawing Sheets

| Sx \ Sy | CFU | BAOC | BOIC | BOI-EXH | BAIC | BIC-RO |
|---|---|---|---|---|---|---|
| CFU | * | | | | | |
| CFB | SyAC | SyAC | SyAC | SyAC | SyAC | SyAC |
| CFNRY | SyAC | SyAC | SyAC | SyAC | SyAC | SyAC |
| CFNRC | SyAC | SyAC | SyAC | SyAC | SyAC | SyAC |
| DCF | SyAC | SyAC | SyAC | SyAC | SyAC | SyAC |
| SPN | SyAC | SyAC | SyAC | SyAC | SyAC | SyAC |
| BICRO | SyAC | | | | | * |

INTERACTION HANDLER FOR TELEPHONE SUBSCRIBER SERVICES

BACKGROUND OF THE INVENTION

1. Technical Field of the Invention

The present invention relates in general to the telecommunications field and, in particular, to a method and system for handling interactions between telephone subscriber services.

2. Description of Related Art

Many new supplementary subscriber services are being introduced into today's telephone networks. However, it has become an increasingly complex process to handle interactions between different subscriber services, since no undesired behavior resulting from the interactions can be tolerated. Consequently, in order to minimize such interactions, different nodes are used to handle supplementary services in existing communication networks. As such, a need has arisen to be able to handle these interactions between services in a much more flexible manner.

Currently, interaction handling functions are distributed across all of the software modules that process the services concerned. In most cases, the interaction handling functions are hard-coded in these software modules. Consequently, in each of these software modules, an interaction decision has to be made whenever a service is to be activated or deactivated.

A significant problem with interaction handling in existing telephony systems is that the undesired behavior that occurs contradicts the original intention of the services involved. Typically, this problem is caused by the different services interacting with each other in many undesired or unpredictable ways. Obviously, this undesirable behavior should be avoided whenever possible.

One approach used to avoid such undesirable behavior is to control the activation and deactivation of the services. In this regard, the technical specifications for these services define how to avoid this behavior, by not allowing the services that can cause the undesired behavior to be activated at the same time. For example, the technical specifications for the Global System for Mobile Communications (GSM) define more than two hundred such service interactions. As such, the service interaction handling functions have to be performed when the defined services are activated or deactivated, or when a mobile communication system subscriber roams from one country to another.

The most significant problems with existing service interaction handling approaches arise when the software being used to perform the interaction handling functions moves into the sustaining phase. If this software is designed to function in the traditional manner (i.e., distributed to all the software modules dealing with the services involved), the following problems arise: (1) It is very difficult to obtain a general overview of the services that will interact, which makes it time-consuming and costly to train designers in this field; (2) It is also very difficult to make changes to the services that will interact; and (3) It is also very difficult to add new services that will interact with the existing services. However, as described below, the present invention successfully resolves these problems.

SUMMARY OF THE INVENTION

In accordance with the present invention, a centralized service interaction handler is provided in a communications network. This interaction handler includes a database with a plurality of matrices, with one matrix for each type of interaction (e.g., activation of a service, deactivation of a service, roaming between countries, etc.). The interaction handler requests (accesses) a pertinent matrix each time such an activation, deactivation, roaming application is executed. The requested matrix is used to determine the action to be taken when a service that interacts with the requested service is encountered.

An important technical advantage of the present invention is that interactions between services can be handled with minimal effect on the services being provided.

Another important technical advantage of the present invention is that new rules with respect to the handling of service interactions can be readily added by inputting the data directly into the pertinent matrix.

Yet another important technical advantage of the present invention is that the interaction handling functions are not hard-coded into the system and can be conveniently changed.

Still another important technical advantage of the present invention is that all interaction handling changes can be made subsequent to the system design phase, which makes it possible to customize the handling functions.

Yet another important technical advantage of the present invention is that the interaction handler can be used independently of the network structure, and can thus be integrated into the network structure in many ways.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, a centralized service interaction handler is provided in a communications network. This interaction handler includes a database with a plurality of matrices, with one matrix for each type of interaction (e.g., activation of a service, deactivation of a service, roaming between countries, etc.). The interaction handler accesses a pertinent matrix each time such an activation, deactivation, roaming, etc. application is executed. The accessed matrix is used to determine the action to be taken when an interacting service is encountered.

Specifically, a subscriber service can have one of the following activation statuses: (1) "active-operate"—this status implies that invocation of the service is allowed; (2) "active-quiescent"—this status implies that a service is active, but invocation of the service is temporarily inhibited; and (3) "deactive"—this status implies that invocation of the service is not allowed.

An "activation matrix" includes two types of services: (1) a service to be activated (called "$S_x$" in the activation matrix); and (2) an interacting service (called "$S_y$" in the activation matrix). If an interaction is possible between an $S_x$ and $S_y$, the intersecting element in the matrix between the two services contains an "interaction type" which determines what action is to be taken. If it is impossible for an interaction to occur between the two services ($S_x$ and $S_y$), the intersecting element in the matrix between the two services will be empty. An example of such an activation matrix is shown in FIG. 1.

Figures 1, 2, 3:
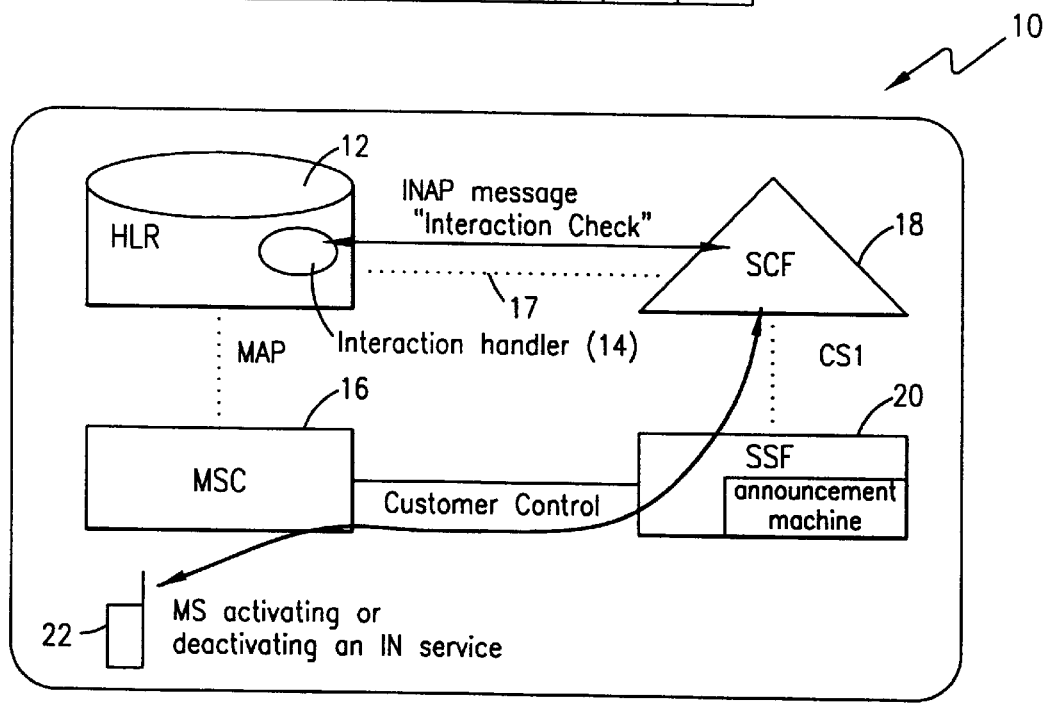
FIG. 1 is a diagram that shows an exemplary subset of an activation matrix that can be used to implement the present invention.
FIG. 2 is a diagram that shows an exemplary subset of a deactivation matrix that can be used to implement the present invention.
FIG. 3 is a block diagram that shows a mobile network including an interaction handler, in accordance with a preferred embodiment of the present invention.

FIG. 1 is a diagram that shows an exemplary subset of an activation matrix that can be used to implement the present invention. As shown, the matrix shown in FIG. 1 can include at least the following four interaction types: (1) Activation of $S_x$—service is denied ($S_x$NC); (2) Activation of $S_x$—service is allowed, but the status is set to "active-quiescent" ($S_x$AQ); (3) Activation of $S_x$—service is allowed, but the status of the $S_y$ is set to "active-quiescent" ($S_y$AQ); and (4) Activation of $S_x$—service is allowed, but the status of the $S_y$ shall be set to "deactive" ($S_y$D). The letters CFU, CFB, CFNRY, etc. are abbreviations for certain subscriber services, such as, for example: Call Forwarding Unconditional (CFU); Call Forwarding on mobile subscriber Busy (CFB); Call Forwarding on No Reply (CFNRY); Call Forwarding on Not Reachable (CFNRC); Default Call Forwarding (DCF); Single Personal Number (SPN); Barring of All Outgoing Calls (BAOC); Barring of All Outgoing International Calls (BOIC) ; Barring of All Incoming Calls (BAIC); Barring of All Incoming Calls when Roaming Outside Home PLMN (BICRO); and Barring of All Outgoing International Calls Except those directed to Home PLMN country (BOIEXH).

Each time a subscriber service is to be activated, the executing software requests the activation matrix, and for the $S_x$ concerned, searches through all of the $S$'s $_y$ and performs the actions according to the interaction types shown (at the row and column intersections in the matrix). An action is performed only in the case where the interacting service is either in an "active-operative" or "active-quiescent" state. For example, in the activation matrix, for the service "CFU", the action $S_y$AQ is performed for the interacting service CFB.

A "deactivation matrix" includes two types of services: (1) a service to be deactivated (called "$S_x$" in the deactivation matrix); and (2) an interacting service (called "$S_y$" in the deactivation matrix). If an interaction is possible between an $S_x$ and $S_y$, the intersecting element in the matrix between the two services contains an "interaction type" which determines what action is to be taken. If it is impossible for an interaction to occur between the two services ($S_x$ and $S_y$), the intersecting element in the matrix between the two services will be empty. An example of such a deactivation matrix is shown in FIG. 2.

FIG. 2 is a diagram that shows an exemplary subset of a deactivation matrix that can be used to implement the present invention. As shown, the matrix shown in FIG. 2 can include at least one interaction type: If the $S_y$ is "active-quiescent" ($S_y$AC), then that service's status will be set to "active-operative" when the $S_x$ is to be deactivated. Again, the letters CFU, BAOC, etc. in FIG. 2 are abbreviations for the services being provided. Each time a subscriber service is to be deactivated, the executing software accesses the deactivation matrix, and for the $S_x$ concerned, searches through all of the $S_y$'s and performs the actions according to the interaction types shown. An action is performed only in the case where the interacting service is in an "active-quiescent" state. For example, in the deactivation matrix, for the service "CFU", the action $S_y$AC is performed for the interacting service CFB.

When the executing software is called up (e.g., just before activating or deactivating a service), it is likely that this action will result in additional call ups of the executing software due to the repercussions of the initial call up. For example, the following illustrates three stages that start with an activation request: (1) The service "A" is to be activated—the activation matrix is accessed by the executing software; (2) This implies that the service "B" is to be deactivated, assuming that service "B" had previously been activated—the deactivation matrix is accessed by the executing software; and (3) This can imply that one or many services will be set to the active-operative state (the number of interacting services affected depends on how many of them are in the active-quiescent state). For example, assume that five call forwarding services will be affected. This implies that the executing software will check the activation matrix for each of the five call forwarding services. As such, the data in the matrix must be set up in a way that prevents having an endless "recursive call chain" occur.

When a subscriber moves (roams) between a Public Land Mobile Network (PLMN) in a home country and another country in any direction, certain interactions can occur between some call forwarding services and some call barring services. These services are used because incoming and outgoing calls can be rather expensive for the subscriber while visiting a foreign country. For this situation, a "movement matrix" can be used by the interaction handler.

A "movement matrix" includes two types of services: (1) call forwarding services (called $S_x$ in the movement matrix); and (2) interacting services (barring services, called $S_y$ in the movement matrix). If an interaction can occur between an $S_x$ and $S_y$, the intersecting element between the two services in the movement matrix contains an "interaction type" that defines what action is to be taken. If it is impossible for an interaction to occur between the two services ($S_x$ and $S_y$), the intersecting element in the matrix between the two services will be empty. The "interaction type" determines that the $S_x$ is set to either "active-operate" or "active-quiescent" depending on: (1) a calculated location condition; and (2) the activation statuses of the $S_x$ and $S_y$.

Each time the subscriber crosses a border between the subscriber's home country and another country (in either direction), the executing software (in the handler) accesses the movement matrix, and for all of the $S_x$'s concerned, searches through all of the $S_y$'s and performs the actions according to the indicated interaction types.

In general, from a network standpoint, a central interaction handler can be implemented in a network either in a centralized or decentralized arrangement. The information flow to and from the central interaction handler can be handled in a "demand" mode or "information" mode. The central interaction handler in the network handles the interactions between all of the services in the network. A request for a service from somewhere else in the same node is handled directly, while a request for a service from a different node is sent via an interface using a multiple application part (MAP) protocol. The request message from the different node includes the subscriber identity (id), service id, and the desired action. The data needed for execution of the interaction handler can either be stored centrally with the interaction handler or not. The interaction handler will execute the pertinent software application and determine whether a requested action is allowed, what additional actions are needed, and then return the results in a message to the requesting node. In the event that an additional action is needed, the external node will send a confirmation to the interaction handler when that additional action is executed.

For this embodiment, the interaction handler needs to have the subscriber information, the subscribers' services, and their activation status. This information can be stored in a centralized database on the same node as the interaction handler. Preferably, this database is updated each time a service is activated in a node. For external nodes, a request and response message are sent over the interface.

In the event that no centralized database exists in the network, the interaction handler has to be kept informed about the status of the subscribers' services. In the "inform" mode, when a request for a service is sent to the interaction handler, all pertinent information about the subscribers' services is added to the request message. In the "demand" mode, when the interaction handler is handling a service request, and part of the service information is missing, the interaction handler will request the missing information from the external node.

For those networks that include both a centralized and decentralized interaction handler, each node in the network preferably includes an interaction handler that handles the interactions between the services on the respective node. After the interaction handling operations have been completed, a request message is sent to the central interaction handler to check the services on the other nodes.

FIG. 3 is a block diagram that shows a mobile network including an interaction handler, in accordance with a preferred embodiment of the present invention. The home location register (HLR) 12 in the network 10 is a node that includes the network's central interaction handler 14. A service control part (SCP) 18 can be a second service handling node in the network. These nodes communicate with each other via an external interface. The SCP 18 sends a request to the HLR 12, in the event that a change of activation status is to be made.

In addition to the interaction handler 14, the HLR 12 preferably includes data to execute the requested services, which are implemented by the SCP 18. The network 10 includes an interface 17 between the HLR 12 and the SCP 18.

A service request message contains the service-id, which can be activated or deactivated, and the change desired to be made. The results message contains an indicator that shows whether a change will be allowed, or the conditions for the change.

Figure 4:
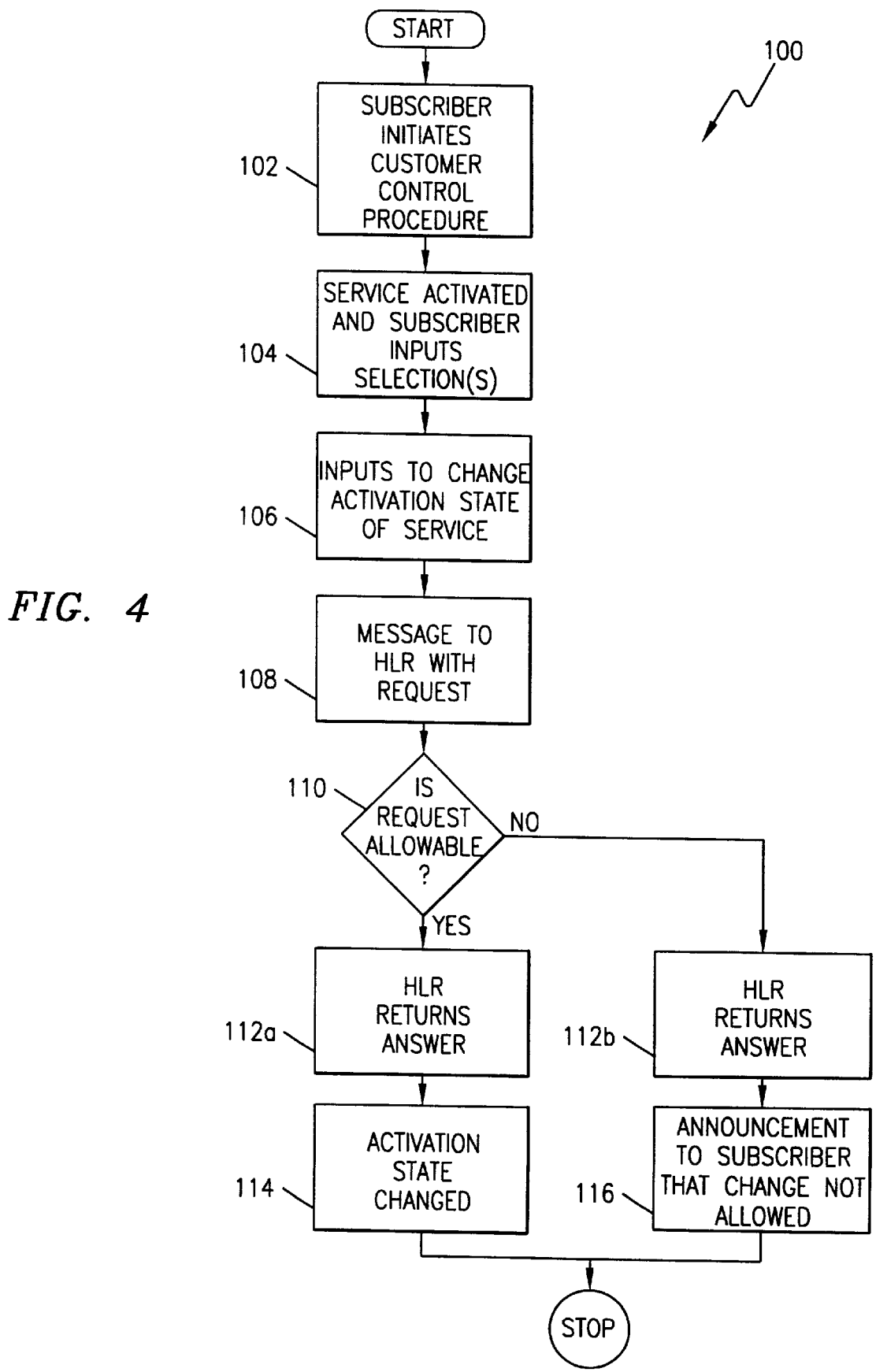
FIG. 4 is a flow diagram that illustrates a method for changing the activation state of a mobile Intelligent Network (IN) service, in accordance with the preferred embodiment of the present invention.

FIG. 4 is a flow diagram that illustrates a method 100 for changing the activation state of a mobile Intelligent Network (IN) service, in accordance with the preferred embodiment of the present invention. At step 102, the subscriber initiates use of the customer control procedure of the IN service "A", by placing a telephone call to the customer control number using the mobile station 22. At step 104, the service is activated, and the subscriber is led through a series of menus by a voice message. At step 106, the subscriber uses the input keypad of mobile station 22 to input the change(s) to be made. In this illustrative case, the subscriber inputs information that elects to change the activation state of service "A" to active.

At step 108, the SCP 18 sends a message to the HLR 12 using the IN application part (INAP) protocol, which contains an interaction check of the request to change the activation state. At step 110, the HLR 12 determines whether the request to change the activation state of the service is allowable, in accordance with the data settings stored in the interaction handler 14. At step 112, the HLR 12 returns a results message to the SCP 18, which contains the response to the request to make the change. At step 114, the SCP 18 changes the activation state, if the change is allowed. Otherwise, at step 116, the SCP 18 plays an announcement to the subscriber (via the mobile services switching center or MSC 16 and the mobile station 22) that the change request is not allowed, using an announcement machine located in the SSF 20.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for handling interactions between services in a communications network, comprising:

a central interaction handler node, within said network, having a plurality of matrices therein, each one of said plurality of matrices representing one of a plurality of service request types, each one of said plurality of matrices including at least a first service and a second services; and a communications node in communication with said interaction handler node for conveying a request for said first service to said interaction node, said request being associated with a given one of said plurality of service request types;

wherein said interaction handler node accesses one of said plurality of matrices associated with said given service request type to determine an interaction type for said first service and said second service, said interaction type indicating whether said first service is allowed, said interaction handler node sending said interaction type to said communications node to perform actions associated with said interaction type.

2. The system of claim 1, wherein said given service request type is a service activation request.

3. The system of claim 1, wherein said given service request type is a service deactivation request.

4. The system of claim 1, wherein said given service request type is a roaming service request.

5. The system of claim 1, wherein said interaction handler node comprises a server.

6. A method for handling interactions between a plurality of services in a communications network, comprising the steps of:

storing, within a central interaction handler node, a plurality of matrices; at least one matrix of said plurality of matrices representing one of a plurality of service request types, said at least one matrix including at least a first service and a second service;

sending a request for said first service from a communications node to said interaction handler node within said network, said request being associated with a given one said plurality of service request types;

accessing, by said interaction handler node, said at least matrix associated with said given service request type;

determining, by said interaction handler node, and intersecting element of said accessed matrix associated with said first service and said second service;

determining, by said interaction handler node, an interaction type for said first service from said intersecting element, said interaction type indicating whether said first service is allowed; and sending said interaction type from said interaction handler node to said communications node to perform actions associated with said interaction type.

7. A method of claim 6, wherein said given service request type is a service activation request.

8. A method of claim 6, wherein said given service request type is a service deactivation request.

9. The method of claim 6, wherein said given service request type is a roaming service request.

10. The method of claim 6, wherein said action to be taken comprises activating said first service.

11. The method of claim 6, wherein said action to be taken comprises denying activation of said first service.

12. The method of claim 6, wherein said action to be taken comprises activating said first service and deactivating one of said plurality of services that can interact with said first service.

* * * * *